United States Patent [19]

Takahashi et al.

[11] Patent Number: 4,715,465

[45] Date of Patent: Dec. 29, 1987

[54] BODY CONSTRUCTION FOR MOTOR SCOOTER VEHICLES

[75] Inventors: Shinji Takahashi, Tokyo; Yoshinori Mita, Saitama, both of Japan

[73] Assignee: Honda Giken Kogyo Kabushiki Kaisha, Tokyo, Japan

[21] Appl. No.: 820,433

[22] Filed: Jan. 17, 1986

[30] Foreign Application Priority Data

Jan. 17, 1985 [JP] Japan ................................. 60-4342
Jan. 17, 1985 [JP] Japan ................................. 60-4344
Mar. 22, 1985 [JP] Japan ................................. 60-39766

[51] Int. Cl.$^4$ ............................................. B62K 11/00
[52] U.S. Cl. ..................................... 180/225; 180/219; 180/229; 296/78.1
[58] Field of Search ............... 180/219, 227, 229, 225; 296/78.1, 38 P, 37.1; D 12/107, 108, 109, 110, 126; 280/289 S

[56] References Cited

U.S. PATENT DOCUMENTS

| | | | |
|---|---|---|---|
| D 269,169 | 5/1983 | Ban et al. | D 12/110 |
| D 273,853 | 5/1984 | Kawashima et al. | D 12/110 |
| 4,441,574 | 4/1984 | Kohyama et al. | 180/219 |
| 4,479,676 | 10/1984 | Hayes | 280/289 S X |
| 4,487,283 | 12/1984 | Suzuki et al. | 296/78.1 X |
| 4,498,700 | 2/1985 | Fujii et al. | 280/289 S X |
| 4,632,448 | 12/1986 | Yagasaki et al. | 296/78.1 X |

OTHER PUBLICATIONS

Blue Ribbon Skoot-Mo-Bile Inc., Advertisement from "Toys and Bicycles", Dec. 1936, vol. 33, No. 12.

*Primary Examiner*—John J. Love
*Assistant Examiner*—Charles R. Watts
*Attorney, Agent, or Firm*—Irving M. Weiner; Joseph P. Carrier; Pamela S. Burt

[57] ABSTRACT

A body construction for a motor scooter vehicle, is supported by a vehicle frame assembly comprising a front frame having a head tube on a front end thereof and a rear frame, and comprises a front cover covering the head tube and a front half portion of the front frame, a central cover covering the rear frame, a floor panel disposed on a rear half portion of the front frame between the front cover and the central cover, and a pair of laterally spaced rear covers cooperating with the central cover in surrounding an engine and its exhaust system. The floor panel has at least a portion integral with the central cover. The rear covers are arranged to cover sides of the floor panel. Each of the rear covers has a side portion extending in covering relation to a side of the vehicle frame assembly, and a substantially flat upper portion bent inwardly from an upper edge of the side portion, the upper portion having at least one outlet opening defined therein for discharging hot air out of the rear cover therethrough. Each rear cover has a rear portion engaging the rear frame and pressed by a rear luggage carrier into engagement with the rear frame.

11 Claims, 16 Drawing Figures

BODY CONSTRUCTION FOR MOTOR SCOOTER VEHICLES

BACKGROUND OF THE INVENTION

1. Field of the Invention

The present invention relates to a body construction employing a low floor for a motor scooter vehicle.

2. Description of Relevant Art

Conventional motor scooter vehicles have a front cover covering a steering column and a front frame and doubling as a leg shield, a central cover covering a rear frame below a rider's seat and a floor panel extending at a low position between the front and central covers and having a pattern of protrusions and depressions on its upper surface for preventing rider's feet from slipping. The floor panel has heretofore been separate from the front cover or the central cover, and had an increased thickness and/or reinforcing ribs for greater rigidity since the floor panel is flat in configuration. Therefore, the floor panel is relatively heavy as compared with the central panel and other body components. Furthermore, no significant attention has been paid to aesthetic improvement of the sides of the floor panel.

The prior motor scooter vehicles also have rear cover which, together with the central cover, surround an engine disposed below the rider's seat, an exhaust pipe extending from the engine, and a muffler coupled to the exhaust pipe. The rear covers however tend to trap hot air heated by the engine, the exhaust pipe, and the muffler, and such hot air adversely affects operation of the engine intake system. The rear covers are located one on each side of the vehicle body. The rear covers have been attached to the vehicle frame assembly through a complex structure, and it has been undesirably difficult and time consuming to install the rear covers on the vehicle frame assembly because of this complex structure.

The present invention has been made in an effort to solve the aforesaid problems of the conventional scooter vehicles.

SUMMARY OF THE INVENTION

It is an object of the present invention to provide a body construction for motor scooter vehicles which includes a rigid and lightweight floor panel having an aesthetically improved appearance, particularly at the sides thereof.

Another object of the present invention is to provide a body construction for motor scooter vehicles which can smoothly discharge hot air heated by an engine, a muffler and other hot components, which would otherwise be trapped by rear covers surrounding these components.

Still another object of the present invention is to provide a body construction for motor scooter vehicles which has a simplified structure for attaching rear covers, whereby the rear covers can be attached to a vehicle frame assembly with ease.

According to the present invention, the above objects can be accomplished by a body construction in a motor scooter vehicle comprising a vehicle frame assembly comprising a front frame having a head tube on a front end thereof and a rear frame, a front cover covering the head tube and a front half portion of the front frame, a central cover covering the rear frame, a floor panel having at least a portion integral with the central cover and disposed on a rear half portion of the front frame, an engine positioned rearwardly of the rear frame and supported thereby, an exhaust system extending from the engine, and a pair of laterally spaced rear covers cooperating with the central cover in surrounding the engine and the exhaust system, the rear covers having portions covering sides of the floor panel.

Each of the rear covers includes a side portion extending longitudinally of the motor scooter vehicle in covering relation to a side of the vehicle frame assembly, and a substantially flat upper portion bent inwardly from an upper edge of the side portion, the upper portion having at least one outlet opening defined therein for discharging hot air out of the rear cover therethrough.

The body construction also includes a rear luggage carrier having one end coupled to the rear frame and a portion disposed on the rear portion of the rear cover, the rear frame and the rear potion of the rear cover having engagement means held in interfitting engagement with each other, the portion of the rear luggage carrier disposed on the rear poriton of the rear cover being arranged to press the rear portion into fitting engagement with the rear frame.

The above and further objects, details, and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
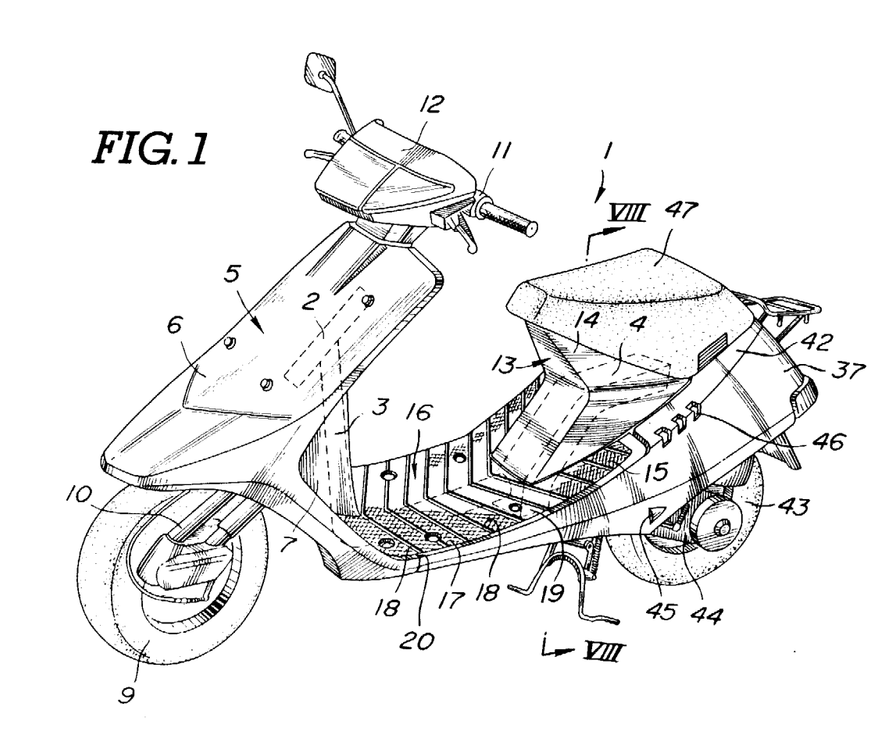
FIG. 1 is a perspective view of a motor scooter vehicle employing a body construction according to the present invention.
Figure 2:
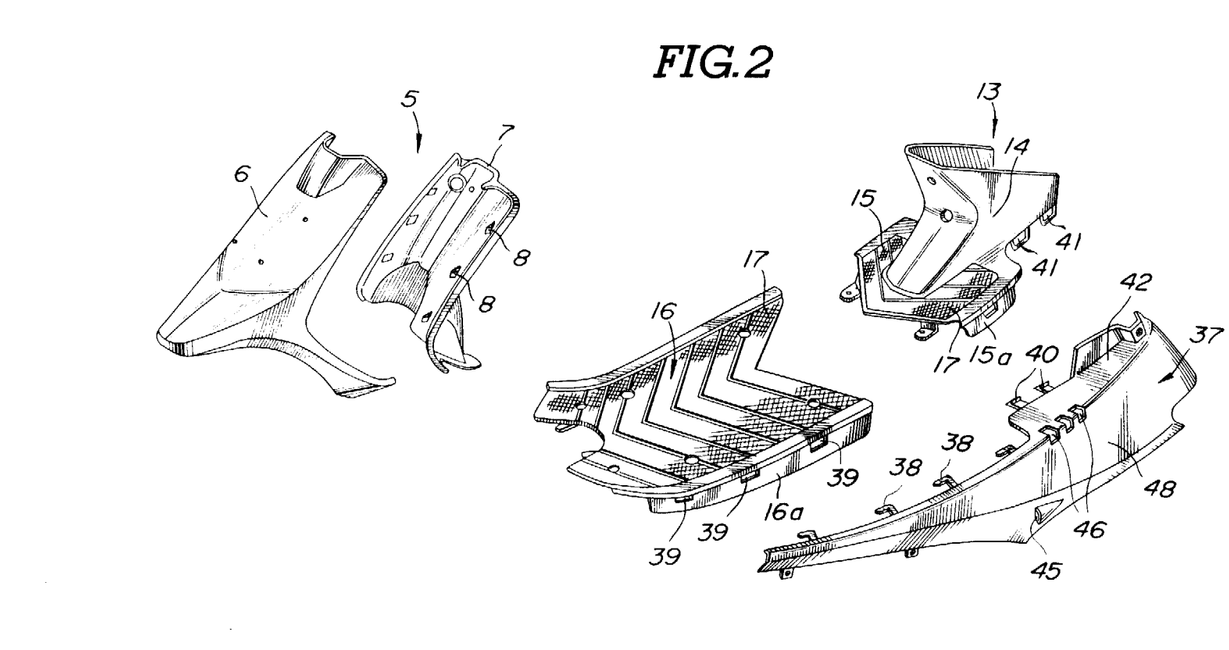
FIG. 2 is an exploded perspective view of the body construction, showing principal components thereof.

As shown in FIGS. 1 and 2, a motor scooter vehicle, generally designated at 1, has a frame assembly essentially comprising a head tube 2, a front frame 3, and a rear frame 4. The front frame 3 extends downwardly from the head tube 2 and includes a substantially horizontal portion extending rearwardly from an intermediate portion thereof. The rear frame 4 which is of a rectangular cross section has a front end coupled to the rear end of the front frame 3 and includes a front portion extending obliquely upwardly from the front frame and a substantially horizontal rear portion extending rearwardly from the front portion.

The head tube 2 and the front half of the front frame 3 are surrounded by a front cover 5. The front cover comprises an outer front cover member 6 providing an integral construction including a front leg shield component and a front wheel fender, and an inner front cover member 7 serving as a rear leg shield component. The outer and inner front cover members 6, 7 are fitted together by means of resilient hooks 8. Below the front cover 5, there are exposed a front wheel 9 and a front fork 10 by which the front wheel 9 is rotatably supported. A handlebar 11 is disposed above the front cover 5 and coupled to the front fork 10. The handlebar 11 supports on its central portion a box-shaped cover 12 housing turn indicator lamps, a speedometer, and other indicators and meters.

A floor panel 16 is mounted on the upper surface of the rear half of the front frame 3 and has a front end securely connected to the rear end of the inner front cover member 7. A central cover 13 is attached to the rear frame 4. The central cover 13 comprises an upstanding portion 14 surrounding the rear frame 4 and supporting a rider's seat 47 on its upper end, and a rear floor 15 integral with the front half of the lower end of the upstanding portion 14 and extending forwardly therefrom. Also, as shown, the rear floor 15 extends obliquely upwardly from a front end thereof to a rear end thereof. The rear floor 15 has a front end securely joined to the rear end of the floor panel 16. The rear floor 15 is highly rigid since it is integral with the upstanding portion 14. The floor panel 16 is also highly rigid and lightweight as it is made shorter by the presence of the rear floor 15.

Figure 3:
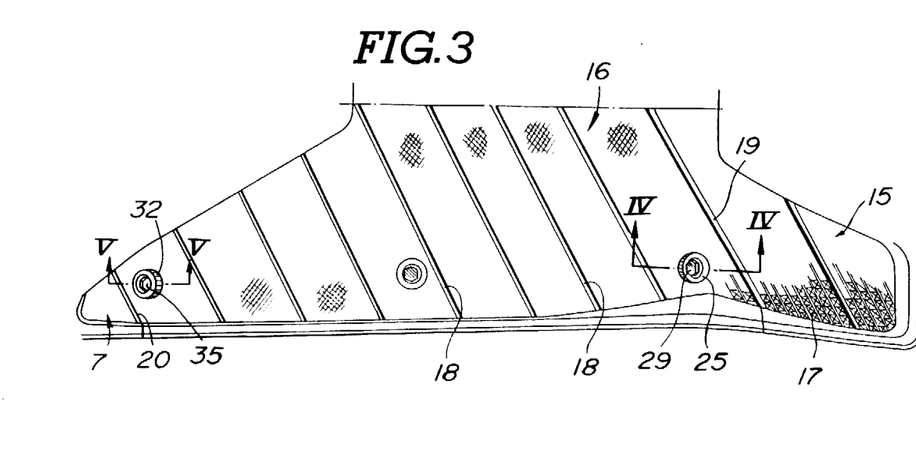
FIG. 3 is a plan view of a half of a floor of the body construction.

The upper surface of the floor panel 16, the upper surface of the rear floor 15, and the upper surface of the rear end of the lower portion of the inner front cover member 7 jointly have a pattern 17 of protrusions and depressions for preventing a rider's feet from slipping thereon. As better shown in FIG. 3, the pattern 17 includes a plurality of gaps or interruptions 18 spaced at given intervals and extending from side edges of the floor panel 16 obliquely to the central axis of the vehicle body. The rear floor 15 of the central cover 3 and the floor panel 16 are interconnected at a joint 19, and the inner front cover member 7 and the floor panel 16 are interconnected at a joint 20. The joints 19, 20 are aligned with the gaps 18.

Figure 4:
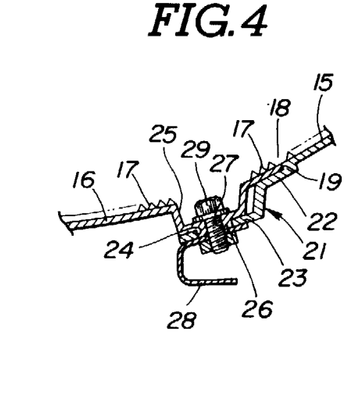
FIG. 4 is an enlarged cross-sectional view taken along line IV—IV of FIG. 3.
Figure 5:
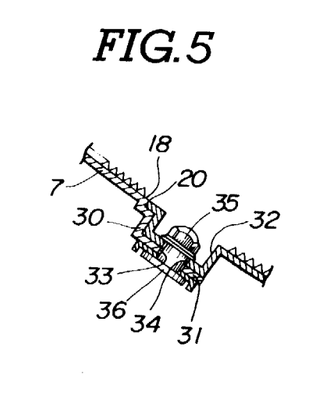
FIG. 5 is an enlarged cross-sectional view taken along line V—V of FIG. 3.

The floor panel 16 is connected to the rear floor 15 and the inner front cover member 7 through joint structures shown in FIGS. 4 and 5, respectively.

As shown in FIG. 4, a bracket 21 integrally projects forwardly from the front edge of the rear floor 15 and has two upper and lower steps 22, 23 successively lowered in the forward direction. The upper step 22 is depressed from the rear floor 15 a distance equal to the thickness of the floor panel 16, and the lower step 23 has an opening 24. The floor panel 16 has a recess 25 having on its bottom a thicker portion 26 fitted in the opening 24 and a bolt insertion hole 27 defined through the thicker portion 26. For assembly, the lower step 23 is placed on a bracket 28 secured to the vehicle frame assembly, and the thicker portion 26 is fitted in the opening 24, followed by fastening the rear floor 15 and the floor panel 16 together by means of a bolt 29 inserted through the hole 27 and a nut threaded over the bolt 29. The rear end of the floor panel 16 is dimensioned such that it abuts against the upper step 22 of the bracket 21 at the time the rear floor 15 and the floor panel 16 are fixed to each other. Since the distance which the upper step 22 is depressed from the rear floor 15 is equal to the thickness of the floor panel 16, the rear floor 15 and the floor panel 16 as they are coupled are held in coplanar relation. The joint 19 between the rear floor 15 and the floor panel 16 remains inconspicuous and is not required to be concealed as by a lacing braid since the joint 19 is aligned with one of the gaps 18 of the pattern 17.

As shown in FIG. 5, the rear end of the inner front cover member 7 has a two-step bracket 30 extending rearwardly. The floor panel 16 has a recess 32 with its bottom held against the lower step 31 of the bracket 30. The lower step 31 and the bottom of the recess 32 have respective bolt insertion holes 33, 34 through which a bolt 35 is inserted. The inner front cover member 7 and the floor panel 16 are fastened by the bolt 35 to a set bar 36. The floor panel 16 and the inner front cover member 7 are held in coplanar relation with the joint 20 therebetween being aligned with one of the gaps 18 of the pattern 17.

As illustrated in FIGS. 1 and 2, a rear cover 37 is connected to the central cover 13 in covering relation to the rear and side portions of the vehicle. The rear cover 37 is disposed on each side of the central cover 13 and the floor cover 16, and comprises a side portion 48 extending longitudinally of the vehicle 1 and an upper portion 42 bent inwardly from the upper edge of the side portion 48 and inclined rearwardly in the upward direction. The upper portion 42 is joined to the flat rear floor 15 in coplanar relation thereto. In order to couple the rear cover 37 to the central cover 13 and the floor panel 16, the rear cover 37 has inward resilient hooks 18 on the upper edge of the side portion 48 in the front half of the rear cover 37. The resilient hooks 48 engage in openings 39 defined in skirts 15a, 16a extending downwardly from the side edges of the rear floor 15 and the floor panel 16. The rear cover 37 also has resilient hooks 40 on the inner edge of the upper portion 42 in the front half of the rear cover 37. The resilient hooks 40 engage in openings 41 defined in the rear portion of the central cover 13. The front half of the rear cover 37, particularly the front half of the side portion 48, covers one side of the floor panel 16. Thus, both sides of the floor panel 16 are covered by the two rear covers 37.

Figure 6:
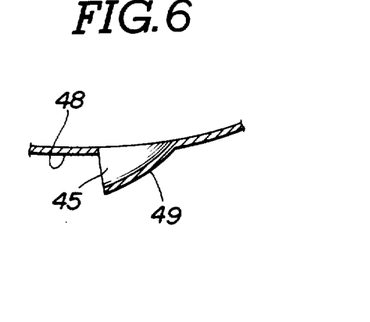
FIG. 6 is an enlarged cross-sectional view of an air inlet opening defined in a rear cover.
Figure 7:
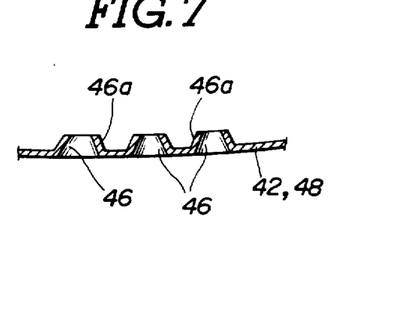
FIG. 7 is an enlarged cross-sectional view of air outlet openings defined in the rear cover.

A power unit 44 by which a rear wheel 43 is rotatably supported is accommodated in the rear covers 37. Each of the rear covers 37 has an air inlet opening 45 defined below the side portion 48, and air outlet openings 46 defined across the boundary between the upper and side portions 42, 48 for discharging hot air from the engine and the muffler. As better shown in FIG. 6, the opening 45 is defined between an outwardly projecting web 49 and the side portion 48. As illustrated in FIG. 7, the air outlet openings 46 are defined in the upper and side portions 42, 48 by surrounding walls 46a projecting inwardly from the upper and side portions 42, 48. The hot air produced in the rear covers 37 goes upwardly along the side portion 48 and is discharged out from the air outlet openings 46 when or before hitting the lower surface of the upper portion 42. Therefore, the hot air from the engine and the muffler is prevented from being trapped in the rear covers 37. The air inlet opening 45 is effective in introducing fresh ambient air into the rear covers 37 and forcing air to flow in the rear covers 37 for promoting the discharge of the air from the openings 46 while the motor scooter vehicle 1 is moving.

Figure 8:
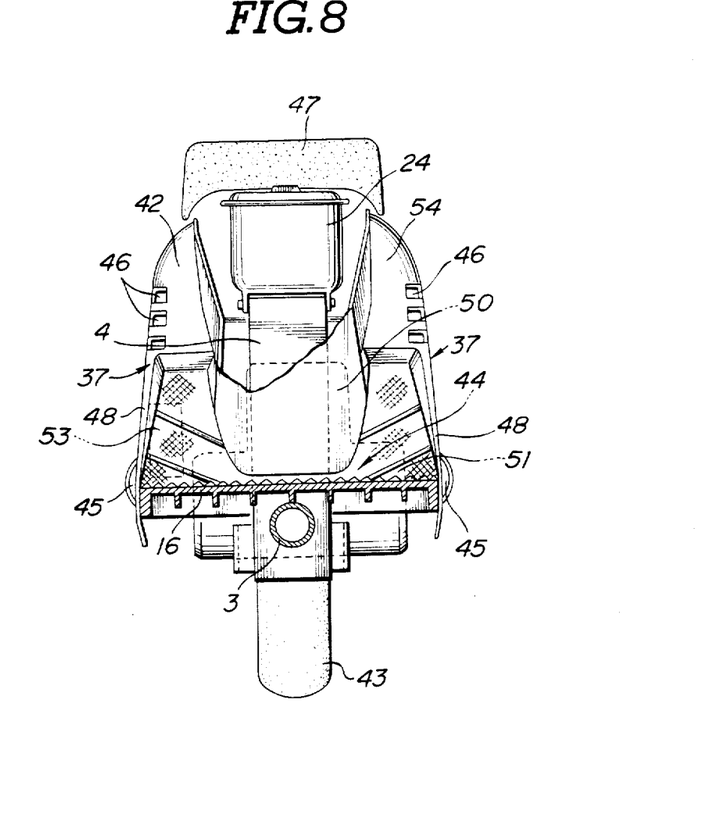
FIG. 8 is an enlarged cross-sectional view taken along line VIII—VIII of FIG. 1.

As shown in FIG. 8, the power unit 44 has a front end (not shown) pivotally supported on the lower back surface of the rear frame 4 within the rear covers 37. The power unit 44 is of an integral construction comprising an engine 50 and a case 51 housing a power transmission element such as a chain. The rear wheel 43 is rotatably supported on the rear end of the case 51. The muffler, denoted at 53, is connected to the rear end of an exhaust pipe extending from the engine 50 and is also housed in one of the rear covers 37. A fuel tank 54 is disposed between the rear frame 4 and the rider's seat 47.

Figures 9, 10:
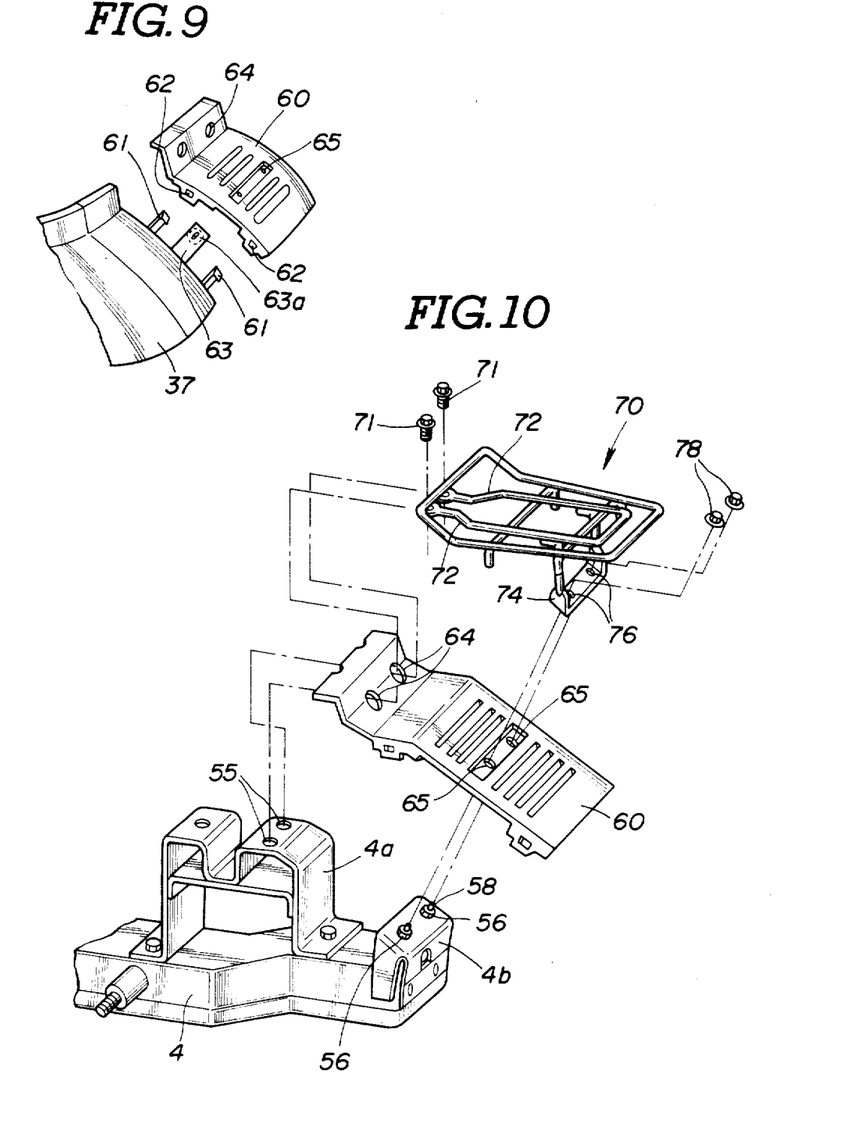
FIG. 9 is a fragmentary perspective view of the rear cover and a rear panel which are to be coupled to each other.
FIG. 10 is an exploded perspective view of a structure by which the rear panel joining the rear covers is attached to a vehicle frame assembly.

The rear ends of the rear covers 37 are interconnected by a rear panel 60 as shown in FIG. 9. The rear panel 60 is coupled to each of the rear covers 37 by resilient hooks 61 formed on the rear end of the rear cover 37 and engaging in respective holes 62 defined in the rear panel 60. A bracket 63 having a bolt insertion hole 63a extends from the rear end of each rear cover 37. A rear luggage carrier 70, the rear panel 60, and each rear cover 37 are fastened together to the rear frame 4 by a bolt (not shown) extending through the bolt insertion hole 63a in the bracket 63. The rear covers 37 are therefore supported on the rear frame 4 through the rear panel 60.

Figures 11, 12, 13:
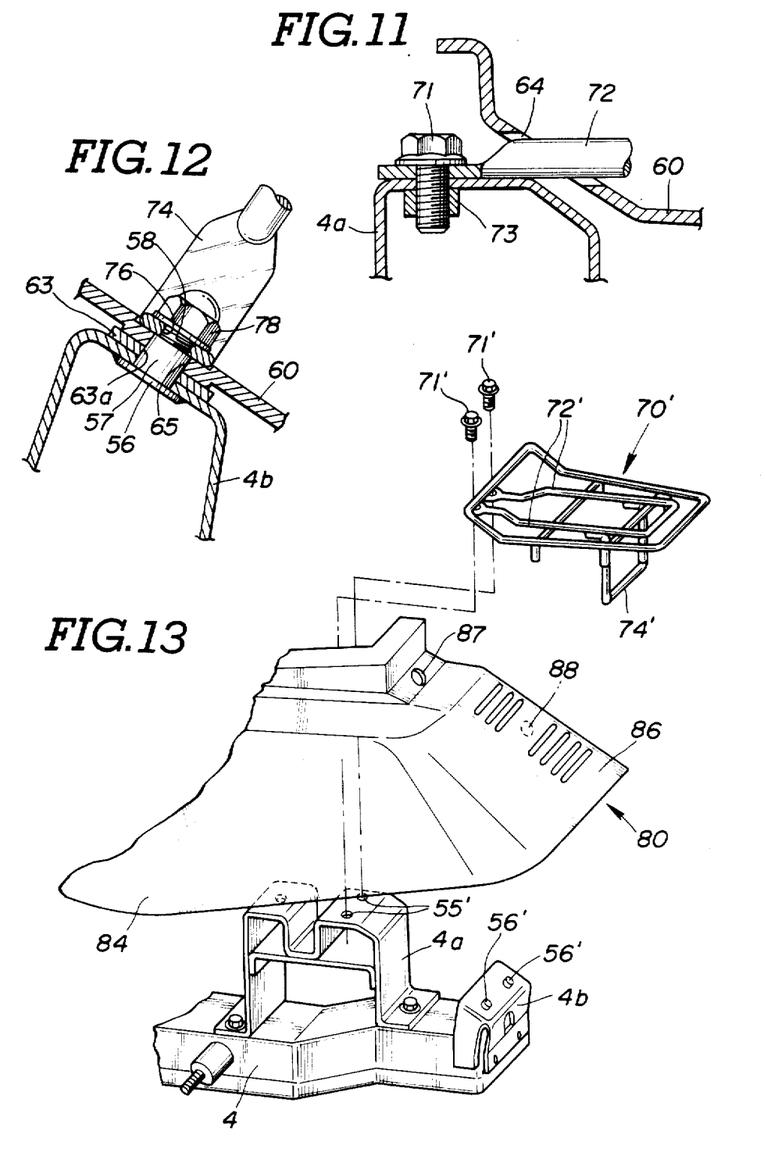
FIG. 11 is an enlarged fragmentary cross-sectional view showing an arrangement in which a rear luggage carrier shown in FIG. 10 is coupled to the vehicle frame assembly.
FIG. 12 is an enlarged fragmentary cross-sectional view illustrating an arrmagement in which the rear luggage carrier, the rear panel, and the rear covers are fastened together.
FIG. 13 is an exploded perspective view of another structure by which rear covers having integral rear panels are attached to a vehicle frame assembly.

More specifically, the rear panel 60 is attached to the rear frame 4 as shown in FIGS. 10 through 12. As shown in FIGS. 10 and 11, the rear luggage carrier, generally denoted at 70, has attachment bars 72 extending respectively through holes 64 defined in the rear panel 60 and secured to the rear frame 4 by bolts 71 extending through bolt insertion holes 55 defined in an attachment member 4a mounted on the upper surface of the rear end of the rear frame 4 and nuts 73 threaded over the bolts 71. As illustrated in FIGS. 10 and 12, an attachment member 4b mounted on the rear end of the rear frame 4 has engagement pins 56 including larger-diameter portions 57 fitted respectively in openings 65 defined in the rear panel 60 and the bolt insertion holes 63a defined in the rear cover brackets 63. The rear luggage carrier 70 also has a substantially U-shaped leg 74 having bolt insertion holes 76 defined therein. The leg 74 is fastened to the attachment member 4b by threaded portions 58 of the engagement pins 56 which extend through the bolt insertion holes 75, respectively, and nuts 78 threaded over the threaded portions 58. As shown in FIG. 12, the upper surface of the rear panel 60 lies substantially flush with the upper surfaces of the larger-diameter portions 57 such that the fastening forces produced by the nuts 78 act on the larger-diameter portions 57.

The rear panel 60 and the rear cover brackets 63 can be assembled together simply by fitting the engagement pins 56 in the openings 65, 63a. The rear panel 60 is securely retained in place by attaching the rear luggage carrier 70 to the attachment members 4a, 4b. Therefore, the assembling process for the rear panel 60 and the rear luggage carrier 70 is quite simple, and the rear panel 60 can be positioned properly and firmly fixed in place reliably in such simple assembling process.

Figure 14:
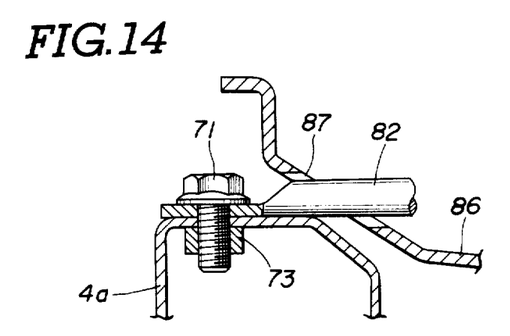
FIG. 14 is an enlarged fragmentary cross-sectional view showing an arrangement in which a rear luggage carrier shown in FIG. 13 is coupled to the vehicle frame assembly.
Figures 15, 16:
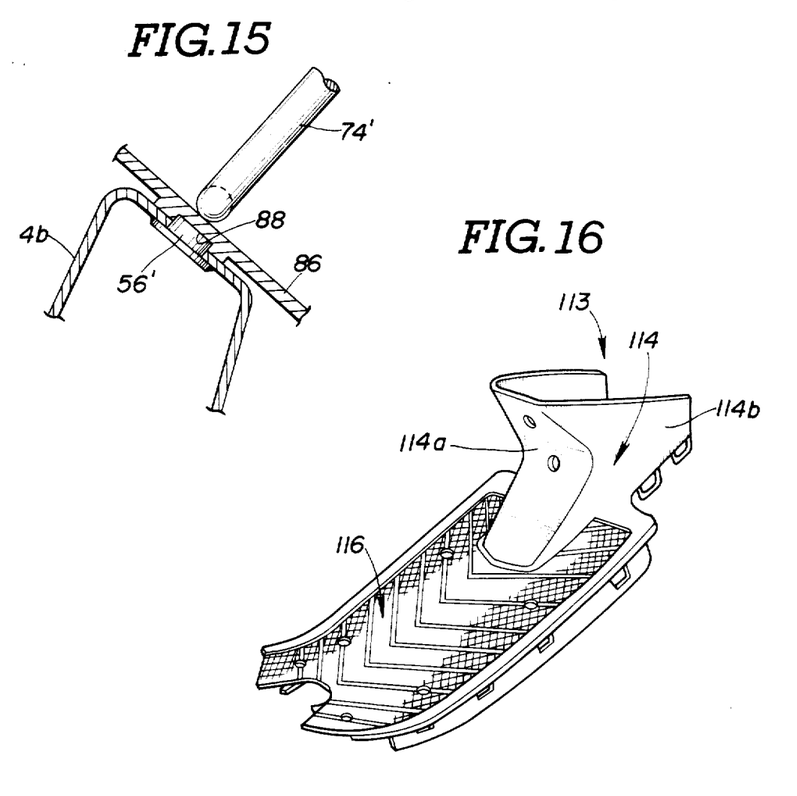
FIG. 15 is an enlarged fragmentary cross-sectional view illustrating an arrangement in which the rear covers shown in FIG. 13 are fastened to the vehicle frame assembly.
FIG. 16 is a perspective view of a central cover integral with an overall floor panel.

FIGS. 13 through 15 show a modified construction by which rear covers are directly attached to the vehicle frame assembly without a separate rear panel. Rear covers 80 (only one shown) which are symmetrical in shape are each of an unitary structure comprising a side portion 84 and a rear panel 86. The rear panel 86 has a recess 88 defined in an inner wall surface thereof. The rear frame 4 has engagement pins 56' on the attachment member 4b. A rear luggage carrier 70' has attachment bars 72' and a substantially U-shaped leg 74'. The rear luggage carrier 70' is securely fixed to the rear frame 4 by bolts 71' extending through the ends of the attachment bars 72' inserted through holes 87 defined in the rear covers 80, and holes 55' defined in the attachment member 4a. The leg 74' is pressed downwardly against the upper surface of the rear panels 86 of the rear covers 80 to keep the engagement pins 56' fitted respectively in the recesses 88, so that the rear panel 86 is securely held in engagement with the rear frame 4.

The rear panels 86 shown in FIG. 13 are simpler in arrangement having only two fastening pins rather than four as in the embodiment of FIG. 10, and thereby to allow the rear covers 80 be attached to the rear frame 4 at an improved rate of production. Also, the integral rear panels 86 on which the rear luggage carrier 70' is placed are better in appearance than the separate rear panel 60.

In the embodiment shown in FIGS. 1 and 2, the central cover 13 has the integral rear floor 15, and the floor panel 16 is separate from the central cover 13. However, the floor panel may be integral with the central cover as shown in FIG. 16.

In FIG. 16, a central cover 113 comprises an upstanding portion 114 having a front wall 114a and a pair of side walls 114b integral therewith, and a floor panel 116 integral with the front half of the lower end of the upstanding portion 114 and extending laterally and forwardly therefrom. The arrangement shown in FIG. 16 is advantageous in that the number of parts required and the number of assembling steps are reduced for improving the production efficiency.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A body construction in a motor scooter vehicle, comprising:

a vehicle frame assembly comprising a front frame having a head tube on a front end thereof and a rear frame;

a front cover covering said head tube and a front half portion of said front frame;

a central cover disposed around said rear frame, and comprising an upright portion surrounding said rear frame;

a floor panel having at least a portion formed as a unitary component with said central cover and disposed on a rear half portion of said front frame;

an engine positioned rearwardly of said rear frame and supported thereby, and an exhaust system extending from said engine; and a pair of laterally spaced rear covers cooperating with said central cover in surrounding said engine and said exhaust system, said rear covers having portions extending forwardly and substantially covering sides of said floor panel and said portions being provided with a plurality of connecting means for connecting said rear covers to said floor panel.

2. A body construction according to claim 1, wherein said floor panel has a portion separate from said central cover.

3. A body construction according to claim 2, wherein said floor panel has a slip-prevention pattern of protrusions and depressions on an upper surface thereof, and said portions integral with and separate from said central cover being coupled to each other through a joint extending in harmony with said pattern.

4. A body construction according to claim 1, wherein said floor panel is entirely integral with said central cover.

5. A body construction according to claim 1, wherein each of said rear covers includes a side portion extending longitudinally of the motor scooter vehicle in covering relation to a side of said vehicle frame assembly, and a substantially flat upper portion bent inwardly from an upper edge of said side portion, said upper portion having at least one outlet opening defined in a forward portion thereof for discharging hot air out of the rear cover through the opening.

6. A body construction according to claim 5, wherein said outlet opening is defined in said upper and side portions across the boundary between said upper and side portions.

7. A body construction according to claim 5, wherein each of said rear covers has an inlet opening defined in said side portion for introducing ambient air into the rear cover.

8. A body construction according to claim 1, wherein each of said rear covers has a side portion extending longitudinally of the motor scooter vehicle in covering relation to a side of the vehicle frame assembly, and a rear portion extending transversely of the motor scooter vehicle in covering relation to a back of the vehicle frame assembly.

9. A body construction according to claim 8, further comprising:

a rear luggage carrier having one end coupled to said rear frame and a portion disposed on said rear portion of each of the rear covers;

said rear frame and said rear portion of each of the rear covers having engagement means held in interfitting engagement with each other; and said portion of the rear luggage carrier disposed on said rear portion of each of the rear covers being arranged to press said rear portions into fitting engagement with said rear frame.

10. A body construction according to claim 9, wherein said rear portion of the rear cover is separate from said side portion thereof.

11. A body construction according to claim 10, further including a bracket through which said side portion of the rear cover, said rear portion thereof, and said luggage carrier are fastened together to said rear frame.

* * * * *

UNITED STATES PATENT AND TRADEMARK OFFICE
CERTIFICATE OF CORRECTION

PATENT NO. : 4,715,465
DATED : December 29, 1987
INVENTOR(S) : Shinji Takahashi et al.

It is certified that error appears in the above-identified patent and that said Letters Patent is hereby corrected as shown below:

```
Column 1, line 16, before "rider's" insert --a--;
          line 26, change "cover" to --covers--.
Column 2, line 18, change "potion" to --portion--;
          line 21, change "poriton" to --portion--;
          line 61, change "arrnagement" to --arrangement--.
Column 3, line 66, change "3" to --13--.
Column 5, line 67, change "75" to --76--.
Column 6, line 19, change "an" to --a--;
          line 37, after "80" insert --to--.
```

Signed and Sealed this

Fourteenth Day of June, 1988

Attest:

DONALD J. QUIGG

*Attesting Officer*    *Commissioner of Patents and Trademarks*